United States Patent
Piantoni et al.

(10) Patent No.: US 10,683,116 B2
(45) Date of Patent: Jun. 16, 2020

(54) GROUPING UNIT AND METHOD TO FORM GROUPS OF HYGIENE ABSORBENT ARTICLES IN A PACKAGING MACHINE

(71) Applicant: GDM S.P.A., Bologna (IT)

(72) Inventors: Matteo Piantoni, Albino (IT); Valerio Soli, Bologna (IT)

(73) Assignee: GDM S.p.A., Bologna (IT)

( * ) Notice: Subject to any disclaimer, the term of this patent is extended or adjusted under 35 U.S.C. 154(b) by 235 days.

(21) Appl. No.: 15/557,234

(22) PCT Filed: Mar. 18, 2016

(86) PCT No.: PCT/IB2016/051526
§ 371 (c)(1),
(2) Date: Sep. 11, 2017

(87) PCT Pub. No.: WO2016/147151
PCT Pub. Date: Sep. 22, 2016

(65) Prior Publication Data
US 2018/0050830 A1    Feb. 22, 2018

(30) Foreign Application Priority Data
Mar. 19, 2015    (IT) .............................. BO2015A0135

(51) Int. Cl.
*B65B 35/24*    (2006.01)
*B65G 47/08*    (2006.01)
(Continued)

(52) U.S. Cl.
CPC .......... *B65B 35/243* (2013.01); *B65B 25/145* (2013.01); *B65B 35/04* (2013.01);
(Continued)

(58) Field of Classification Search
CPC ................. B65G 47/08; B65G 47/082; B65G 2205/00–06; B65H 29/38; B65H 29/40;
(Continued)

(56) References Cited

U.S. PATENT DOCUMENTS 1,760,030 A * 5/1930 Alger ...................... B42C 13/00
412/19
4,124,203 A * 11/1978 Muller ..................... B65H 5/30
270/52.2
(Continued)

FOREIGN PATENT DOCUMENTS

CN    1323730 A    11/2001
EP    0806380 A1    11/1997
(Continued)

OTHER PUBLICATIONS

Ferris et al., In-line substrate escapement, IBM Technical Disclosure Bulletin, 10(2):148 (1967).
(Continued)

*Primary Examiner* — Stephen F. Gerrity
*Assistant Examiner* — Joshua G Kotis
(74) *Attorney, Agent, or Firm* — Marshall, Gerstein & Borun LLP

(57) ABSTRACT

Grouping unit and method to form groups of hygiene absorbent articles in a packaging machine; a conveyor which receives the single hygiene absorbent articles in an input station is provided, which feeds the hygiene absorbent articles along a grouping path, and releases the groups of hygiene absorbent articles in an output station; wherein the conveyor has a belt which is closed so as to form a ring, is wound around at least two pulleys, and supports a plurality of blades, which extend perpendicular to the belt and delimit, between one another, respective pockets, which are each designed to hold a corresponding hygiene absorbent
(Continued)

article; an active braking device is provided, which is arranged at the input station so as to cooperate with a pocket arranged in the input station to slow down the movement with which a corresponding hygiene absorbent article enters the pocket.

8 Claims, 10 Drawing Sheets

(51) Int. Cl.
*B65H 29/38* (2006.01)
*B65B 35/04* (2006.01)
*B65B 25/14* (2006.01)
*B65B 35/30* (2006.01)

(52) U.S. Cl.
CPC ............ *B65B 35/30* (2013.01); *B65G 47/082* (2013.01); *B65H 29/38* (2013.01); *B65G 2205/06* (2013.01); *B65H 2301/321* (2013.01); *B65H 2301/4474* (2013.01); *B65H 2301/4476* (2013.01); *B65H 2404/311* (2013.01); *B65H 2404/63* (2013.01); *B65H 2701/1924* (2013.01)

(58) Field of Classification Search
CPC .................... B65H 29/44; B65H 29/68; B65H 2301/4476; B65H 2404/232; B65H 2404/2321; B65H 2404/2322; B65H 2404/311; B65H 2404/3111; B65H 2601/261; B65H 2701/1924; B65B 35/205; B65B 35/243; B65B 35/405; B65B 35/30; B65B 25/14; B65B 25/141; B65B 25/143; B65B 25/145; B65B 35/46; B65B 35/50; B65B 27/08–086
USPC .......... 271/178, 182, 183, 315; 53/439, 529, 53/147, 152, 443, 542; 414/790.8, 414/790.9–791.1
See application file for complete search history.

(56) References Cited

U.S. PATENT DOCUMENTS

| | | | | |
|---|---|---|---|---|
| 5,127,209 A | * | 7/1992 | Hunter | B65B 35/44 198/419.3 |
| 5,360,316 A | * | 11/1994 | O'Mara | B07C 1/04 198/530 |
| 5,620,081 A | * | 4/1997 | Kivits | B65G 47/252 198/384 |
| 5,897,291 A | * | 4/1999 | Gerwe | B65B 35/24 414/790.7 |
| 6,065,746 A | * | 5/2000 | Tranquilla | B65H 29/68 193/32 |
| 6,644,461 B1 | * | 11/2003 | Imbert | B07C 1/04 198/418.7 |
| 6,834,755 B2 | * | 12/2004 | Jay | B65B 23/14 198/418.6 |
| 8,317,183 B2 | * | 11/2012 | Brunschwiler | B65H 29/68 270/52.19 |
| 8,583,279 B2 | * | 11/2013 | Fecht | B65B 35/44 198/347.1 |
| 2001/0040085 A1 | | 11/2001 | Rebeaud | |
| 2007/0108218 A1 | * | 5/2007 | Schmetzer | B65H 29/38 221/2 |
| 2010/0071318 A1 | * | 3/2010 | Brandhorst | B65B 35/54 53/446 |
| 2010/0230887 A1 | * | 9/2010 | Stauber | B65H 29/003 270/52.2 |
| 2013/0068590 A1 | * | 3/2013 | Fujita | B65G 47/841 198/426 |
| 2013/0156536 A1 | * | 6/2013 | Dowiasch | A61F 13/55115 414/789.6 |
| 2014/0151188 A1 | * | 6/2014 | Schulte | B65G 37/00 198/431 |

FOREIGN PATENT DOCUMENTS

| | | |
|---|---|---|
| WO | WO-99/18021 A1 | 4/1999 |
| WO | WO-2013/000527 A1 | 1/2013 |
| WO | WO-2013/107985 A1 | 7/2013 |

OTHER PUBLICATIONS

International Search Report and Written Opinion, International Application No. PCT/IB2016/051526, dated Jun. 29, 2016.

* cited by examiner

GROUPING UNIT AND METHOD TO FORM GROUPS OF HYGIENE ABSORBENT ARTICLES IN A PACKAGING MACHINE

CROSS-REFERENCE TO RELATED APPLICATIONS

This is the U.S. national phase of International Application No. PCT/IB2016/051526, filed Mar. 18, 2016, which claims the benefit of Italian Patent Application No. BO2015A000135, filed Mar. 19, 2015.

TECHNICAL FIELD

The present invention relates to a grouping unit and method to form groups of hygiene absorbent articles in a packaging machine.

PRIOR ART

A packaging machine for hygiene absorbent articles normally comprises a feeding unit that receives the hygiene absorbent articles in succession from a manufacturing machine and, if necessary, rotates the hygiene absorbent articles to impart to hygiene absorbent articles themselves the correct orientation, a grouping unit to form groups of hygiene absorbent articles, and a wrapping unit which introduces the groups of hygiene absorbent articles in corresponding wraps to form the packs.

The grouping unit (for example as described in patent application WO9918021A1) comprises a conveyor which receives in succession single hygiene absorbent articles from the feeding unit in an input station and transfers groups of hygiene absorbent articles to the wrapping unit in an output station. The grouping unit comprises a conveyor in turn comprising a belt, which is closed so as to form a ring, is vertically arranged, and is wound around pulleys. Along the belt a plurality of pockets is defined, each of which is adapted to house a respective hygiene absorbent article, and a static support plane, which is arranged horizontally below the belt and on which the hygiene absorbent articles carried by the pockets rest and slide as they advance along a grouping path. The belt supports a plurality of blades, each of which extends perpendicularly to the belt and laterally delimits a respective pocket. For obvious geometric constraints, two successive and adjacent blades are parallel to each other along the rectilinear sections of the grouping path and are inclined one with respect to the other along the curvilinear sections of the grouping path in the area wherein the belt is wound around a pulley; accordingly, each pocket has a minimum width along the rectilinear sections of the grouping path and has a maximum width along the curvilinear sections of the grouping path P. The input station is arranged at a pulley, and therefore in the input station each pocket has the maximum width that facilitates the introduction of the corresponding hygiene absorbent article, whereas the output station is arranged between two pulleys, and therefore in the output station the pockets have the minimum width (which, however, does not constitute an obstacle for the removing of a group of hygiene absorbent articles from the corresponding pockets).

It was observed that operating at high hourly productivity (indicatively when a productivity of 700-900 articles per minute is exceeded) the frequency of clogging in the grouping unit significantly increases, i.e. the frequency with which a hygiene absorbent article assumes an unwanted position in the grouping unit that determines the partial or total destruction of the hygiene absorbent article itself and especially determines the automatic stop of the grouping unit (and therefore of the whole packaging machine) so as to allow removing the shreds of the hygiene absorbent article and then restore the full functionality of the grouping unit.

The patent application WO2013000527A1 describes a grouping unit to form groups of hygiene absorbent articles in a packaging machine wherein a conveyor which receives single hygiene absorbent articles in an input station is provided, which feeds the hygiene absorbent articles along a grouping path, and releases the groups of hygiene absorbent articles in an output station; a braking device is provided, which is arranged at the input station in order to slow down the introduction movement of the hygiene absorbent articles. However, the braking device described in the patent application WO2013000527A1 has a very complex and bulky structure that involves both high production costs, and a negative impact on all the other elements arranged at or close to the input station.

DESCRIPTION OF THE INVENTION

The object of the present invention is to provide a grouping unit and a method to form groups of hygiene absorbent articles in a packaging machine, which grouping unit is free from the drawbacks described above and, at the same time, is simple and inexpensive to produce.

According to the present invention, a grouping unit and a method to form groups of hygiene absorbent articles in a packaging machine, as claimed in the attached claims, are provided.

BRIEF DESCRIPTION OF THE DRAWINGS

The present invention will now be described with reference to the accompanying drawings, which illustrate a non-limiting embodiment, wherein.

PREFERRED EMBODIMENTS OF THE INVENTION

Figure 1:
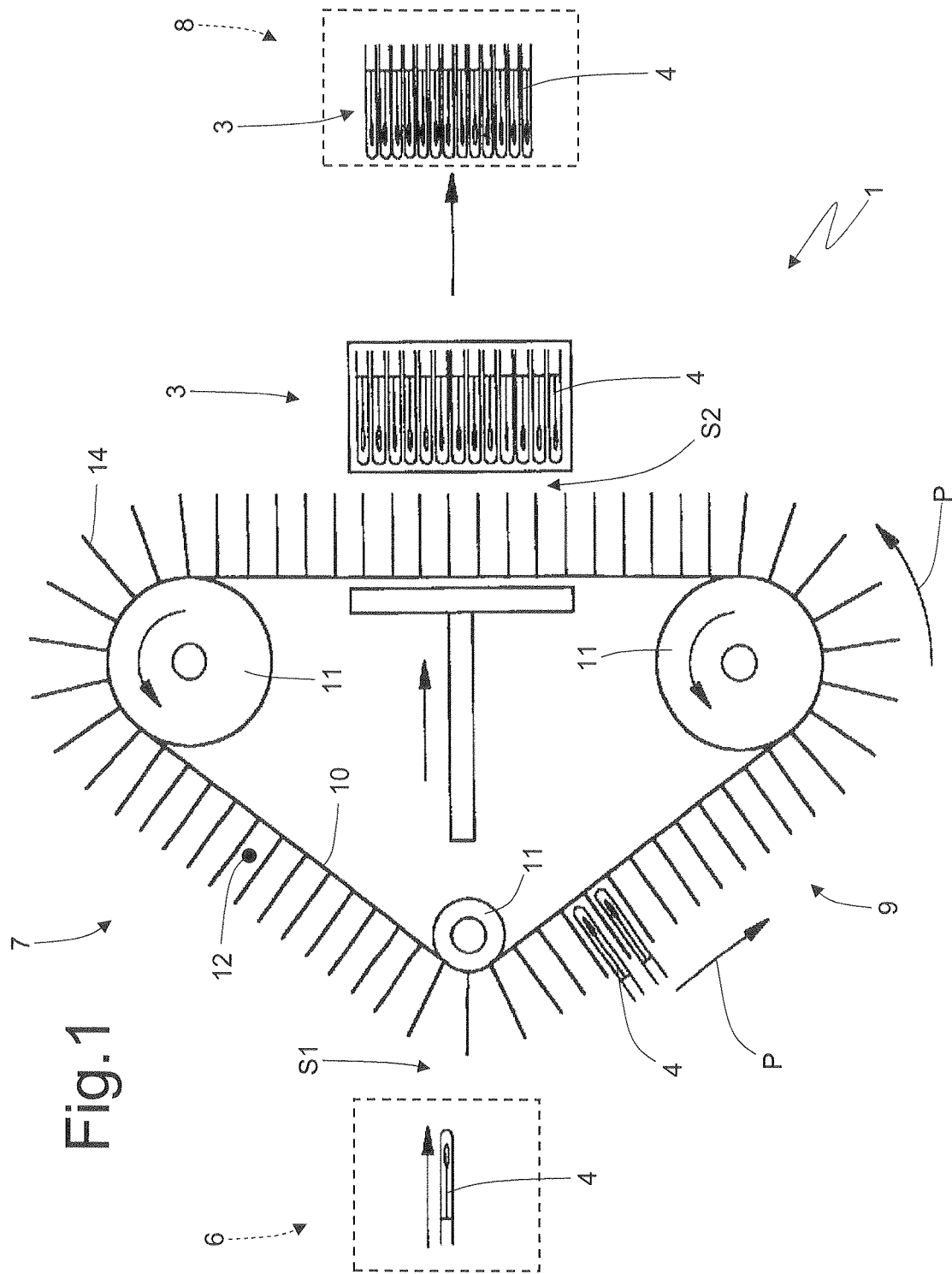
FIG. 1 is a plan and schematic view of a packaging machine for producing packs of hygiene absorbent articles.
Figure 2:
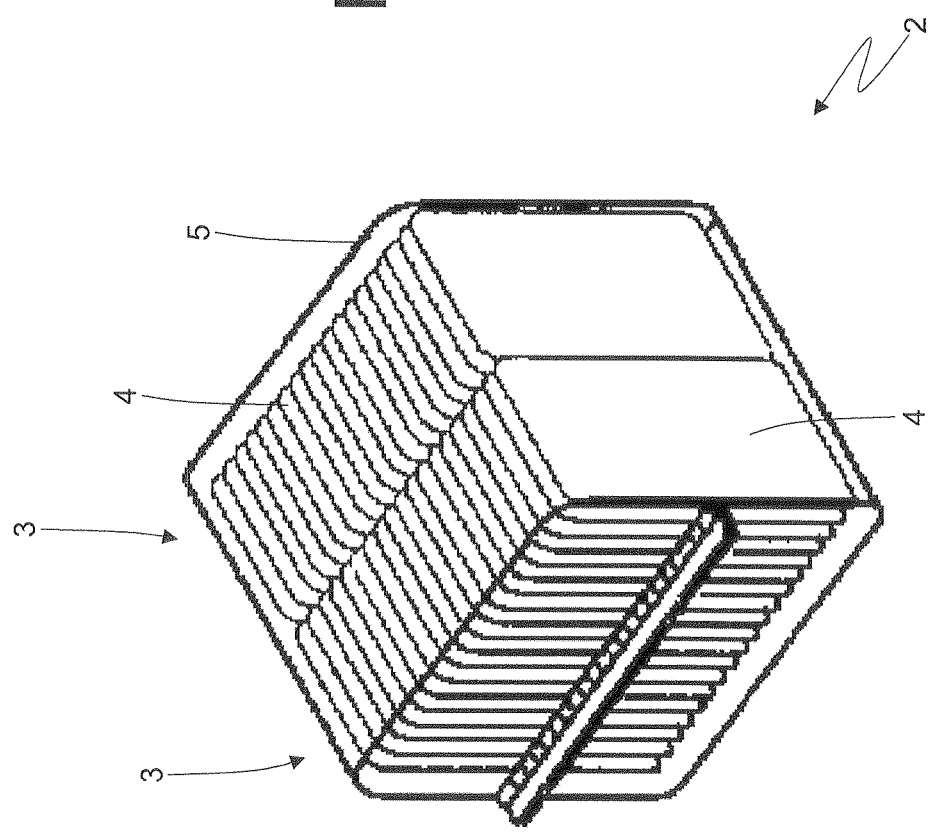
FIG. 2 is a perspective and schematic view of a pack of hygiene absorbent articles produced by the packaging machine of FIG. 1.

In FIG. 1, number 1 denotes as a whole a packaging machine for producing a pack 2 (illustrated in FIG. 2) formed by at least a group 3 of hygiene absorbent articles 4 (for example diapers) enclosed in a wrap 5 (typically of heat-sealable plastic material).

The packaging machine 1 comprises a known type feeding unit 6 which receives the hygiene absorbent articles 4 in succession from a manufacturing machine arranged upstream from the packaging machine 1 and which, if necessary, rotates the hygiene absorbent articles 4 to impart to the hygiene absorbent articles 4 themselves the correct orientation. The packaging machine 1 also comprises a grouping unit 7 to form groups 3 of hygiene absorbent articles 4, which receives in succession single hygiene absorbent articles 4 from the feeding unit 6 at an input station S1, and transfers groups 3 of hygiene absorbent articles 4 to a wrapping unit 8 in an output station S2. The wrapping unit 8 receives the groups 3 of hygiene absorbent articles 4 and introduces the groups 3 of hygiene absorbent articles 4 in corresponding wraps 5 to form packs 2; in the embodiment illustrated in FIG. 2, in each wrap 5 two groups 3 of hygiene absorbent articles 4 are inserted, arranged side by side while according to other and perfectly equivalent embodiments in each wrap 5 a single group 3 of hygiene absorbent articles 4 is inserted or three, four or more groups 3 of hygiene absorbent articles 4 are inserted.

As illustrated in FIG. 1, the grouping unit 7 comprises a conveyor 9 which advances with continuous motion (or with a non-stop law of motion), receives the single hygiene absorbent articles 4 in the input station S1, feeds the hygiene absorbent articles 4 along a grouping path P, and releases the groups 3 of hygiene absorbent articles 4 in the output station S2. The conveyor 9 comprises at least one belt 10, which is closed so as to form a ring, is vertically arranged and is wound around three pulleys 11 arranged horizontally and mounted for rotating about respective central and vertical axes of rotation; at least one pulley is motorized to rotate with continuous motion around its central rotation axis and thus impart to the belt 10 a corresponding continuous motion, while the other pulleys 11 are idly mounted.

Along the belt 10 a plurality of pockets 12 is defined, each of which is adapted to house a respective hygiene absorbent article 4 to accompany (push) the hygiene absorbent article 4 along the grouping path P; in particular, each pocket 12 receives a respective hygiene absorbent article 4 at the input station S1 and releases the respective hygiene absorbent article 4 along with other hygiene absorbent articles 4 forming a group 3 at the output station S2. Furthermore, the conveyor 9 comprises a stationary support plane 13 (i.e. completely fixed), which is arranged horizontally below the belt 10 (therefore below the pockets 12) and on which the hygiene absorbent articles 4 carried by pockets 12 rest and slide as they advance along the grouping path P.

The belt 10 supports a plurality of blades 14, each of which extends perpendicularly to the belt 10 and laterally delimits a respective pocket 12 (i.e. forming the wall of the respective pocket 12). Consequently, each pocket 12 is defined and delimited by two successive and facing blades 14 and a blade 14 itself delimits on one side a pocket 12 and on the opposite side another preceding or successive pocket 12. For obvious geometric constraints, two successive and adjacent blades 14 are parallel to each other along the rectilinear sections of the grouping path P (i.e. along the sections of the grouping path P comprised between two pulleys 11) and are mutually inclined (that is, converging towards the central rotation axis of the corresponding pulley 11) along the curvilinear sections of the grouping path P (i.e. at a pulley 11 in the area where the belt 10 is wound around the pulley 11). Consequently, each pocket 12 has a minimum width along the rectilinear sections of the grouping path P and has a maximum width along the curvilinear sections of the grouping path P. The input station S1 is arranged at a pulley 11 (i.e. along a curvilinear section of the grouping path P), and then in the input station S1 each pocket 12 has the maximum width that facilitates the entry of the corresponding hygiene absorbent article 4, while the output station S2 is arranged between two pulleys 11 (i.e. along a rectilinear section of the grouping path P), and then in the output station S2, the pockets 12 have the minimum width (which, however, does not constitute an obstacle for the removal of a group 3 of hygiene absorbent articles 4 from the corresponding pockets 12).

Figure 3:
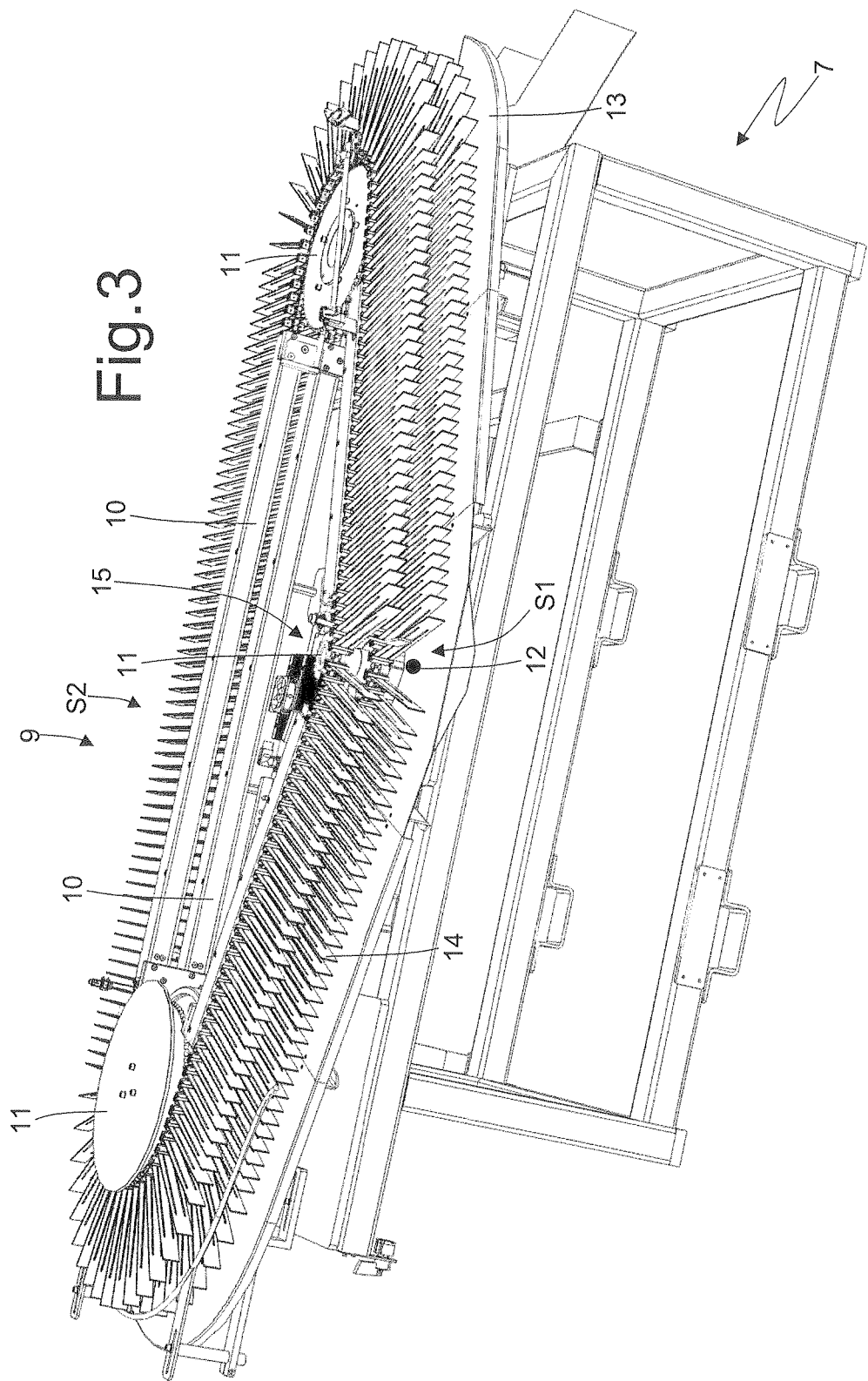
FIG. 3 is a perspective view and with the removal of parts for clarity of a grouping unit of the packaging machine of FIG. 1, which grouping unit forms groups of hygiene absorbent articles and is produced according to the present invention.
Figure 4:
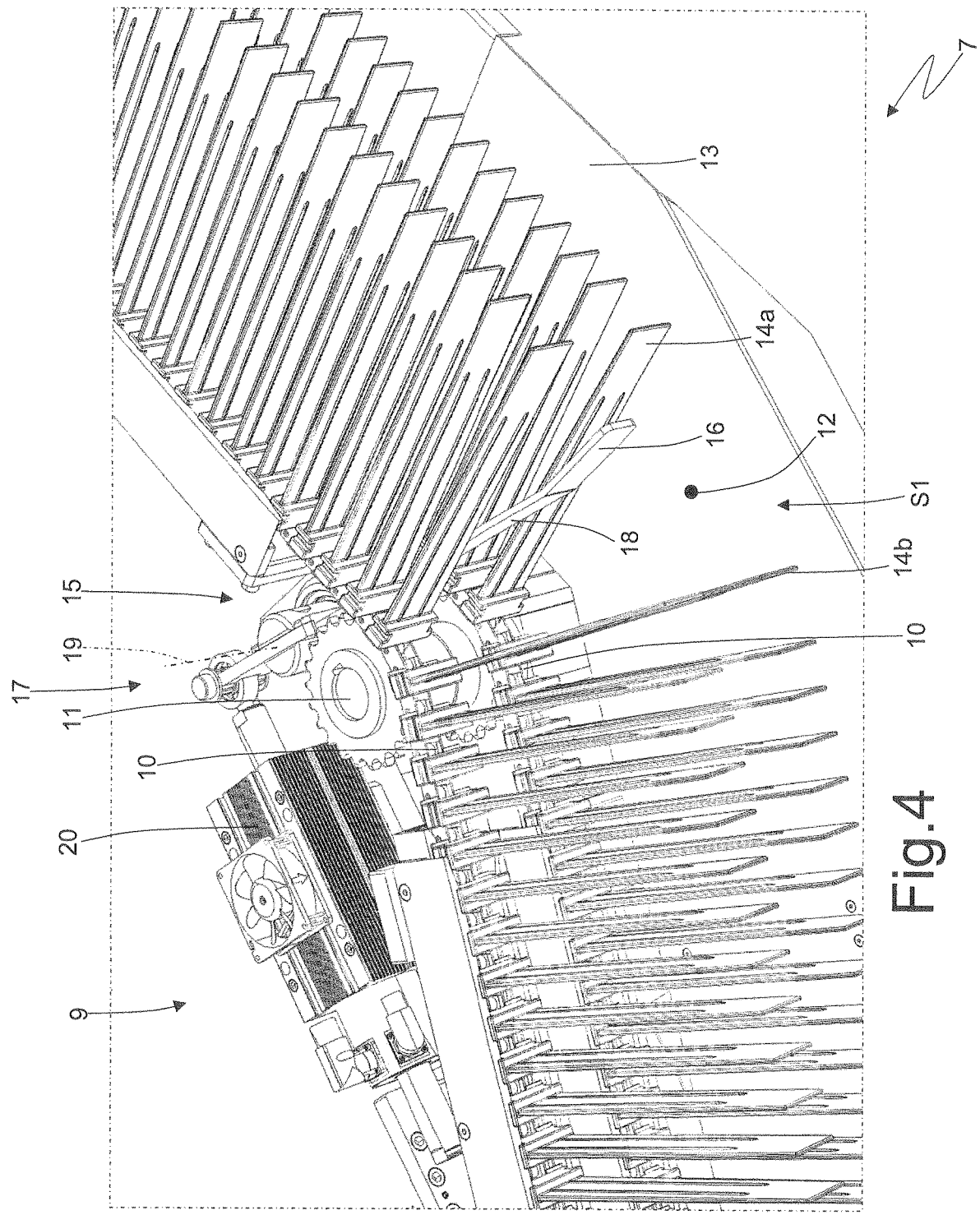
FIG. 4 is a perspective view and with the removal of parts for clarity of an input station of the grouping unit of FIG. 3.

According to the preferred (but not limiting) embodiment illustrated in FIGS. 3 and 4, the conveyor 9 comprises two belts 10 which overlap one another, are vertically aligned, are arranged at a given distance from one another, and each comprising a succession of blades 14 so that each pocket 12 is delimited, on each side, by a pair of blades 14, which are vertically arranged one above the other and at a given distance from one another. According to other and completely equivalent embodiments not illustrated, the conveyor 9 comprises a single belt 10 or comprises three belts 10 which overlap one another.

Figure 5:
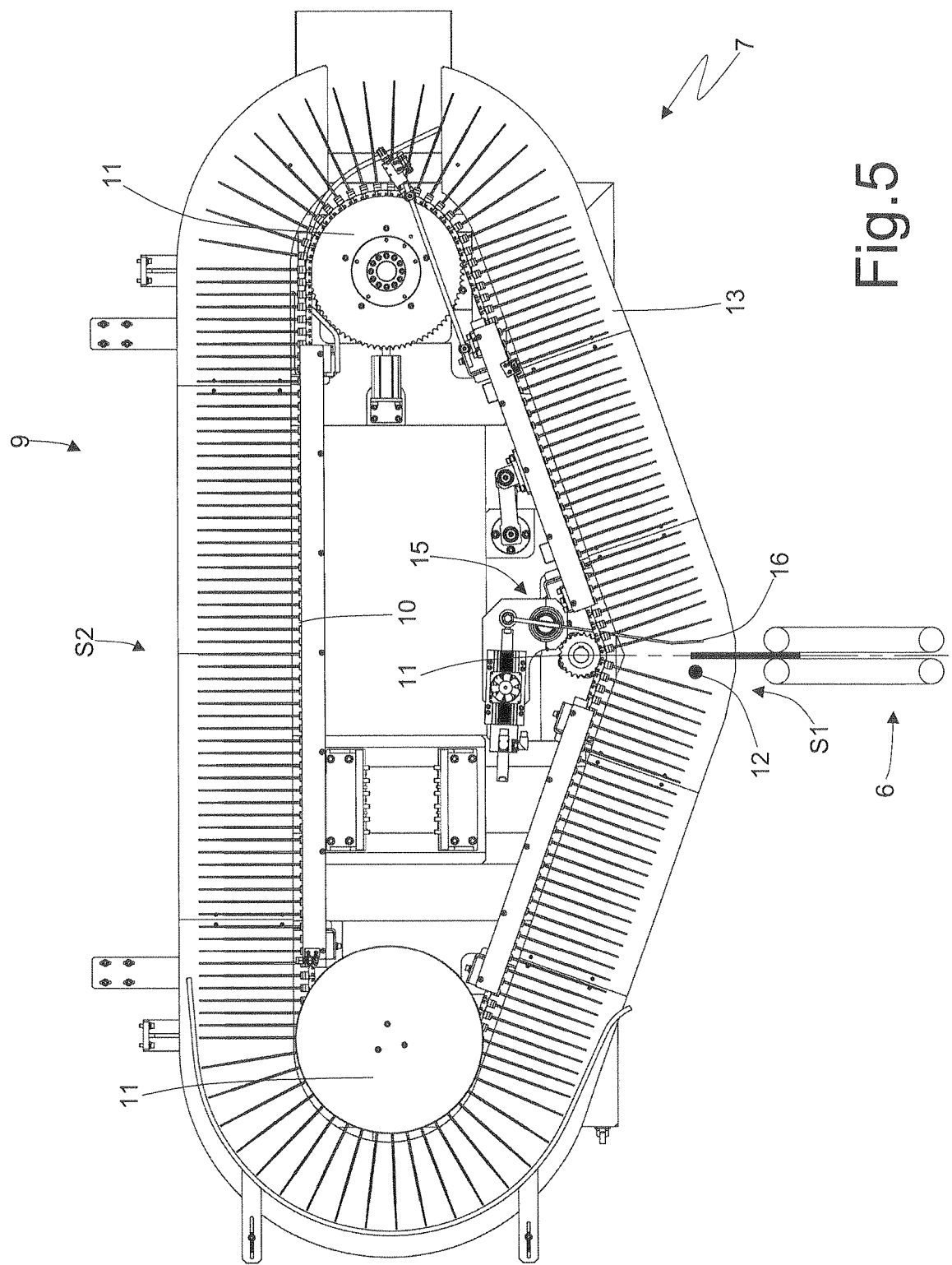
FIG. 5 is a plan view and with the removal of parts for clarity of the grouping unit of FIG. 3.
Figure 6:
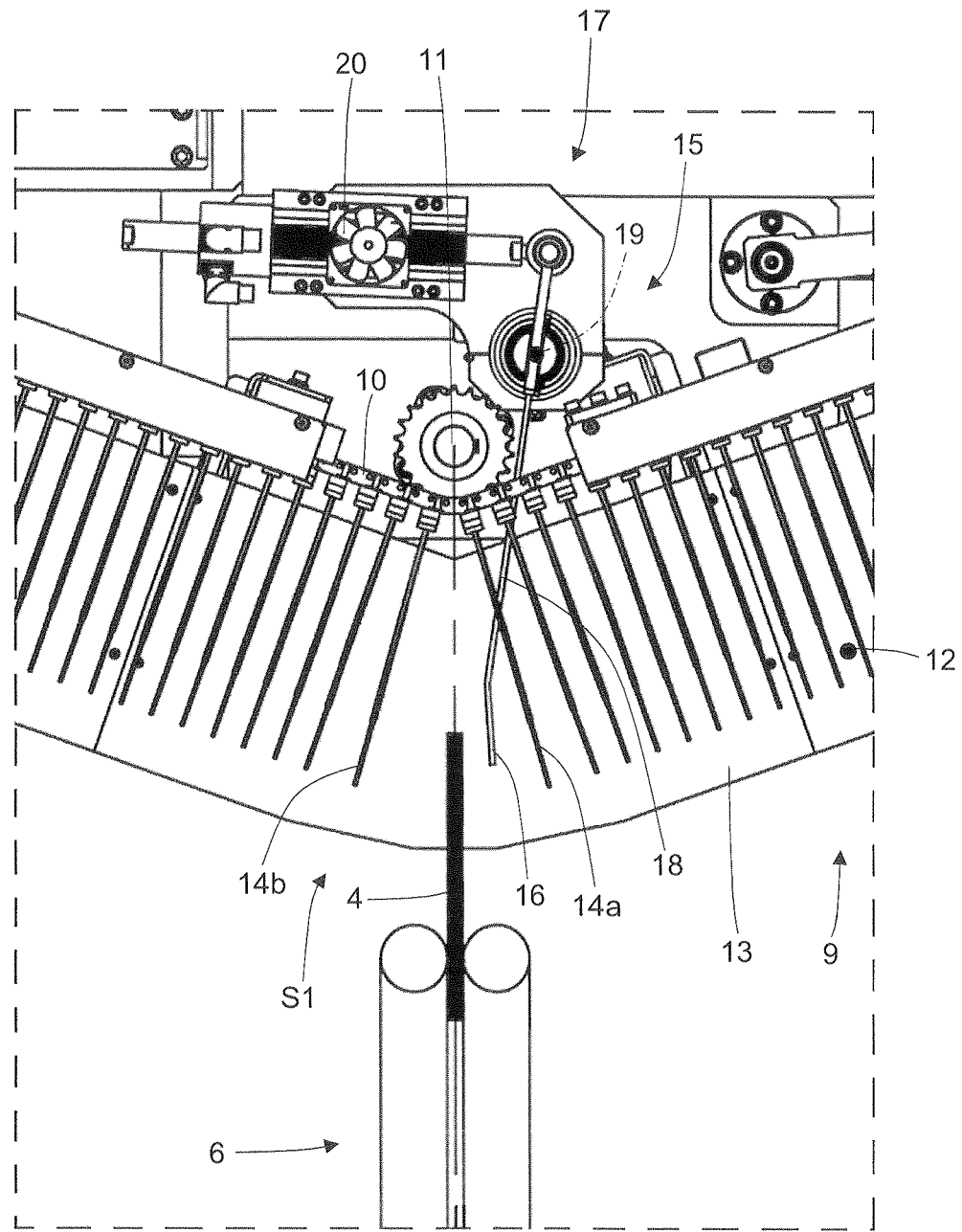
FIGS. 6-10 are views in plan and with the removal of parts for clarity of the input station of FIG. 5 during respective steps of the introduction of the hygiene absorbent article into a pocket of the grouping unit.
Figure 7:
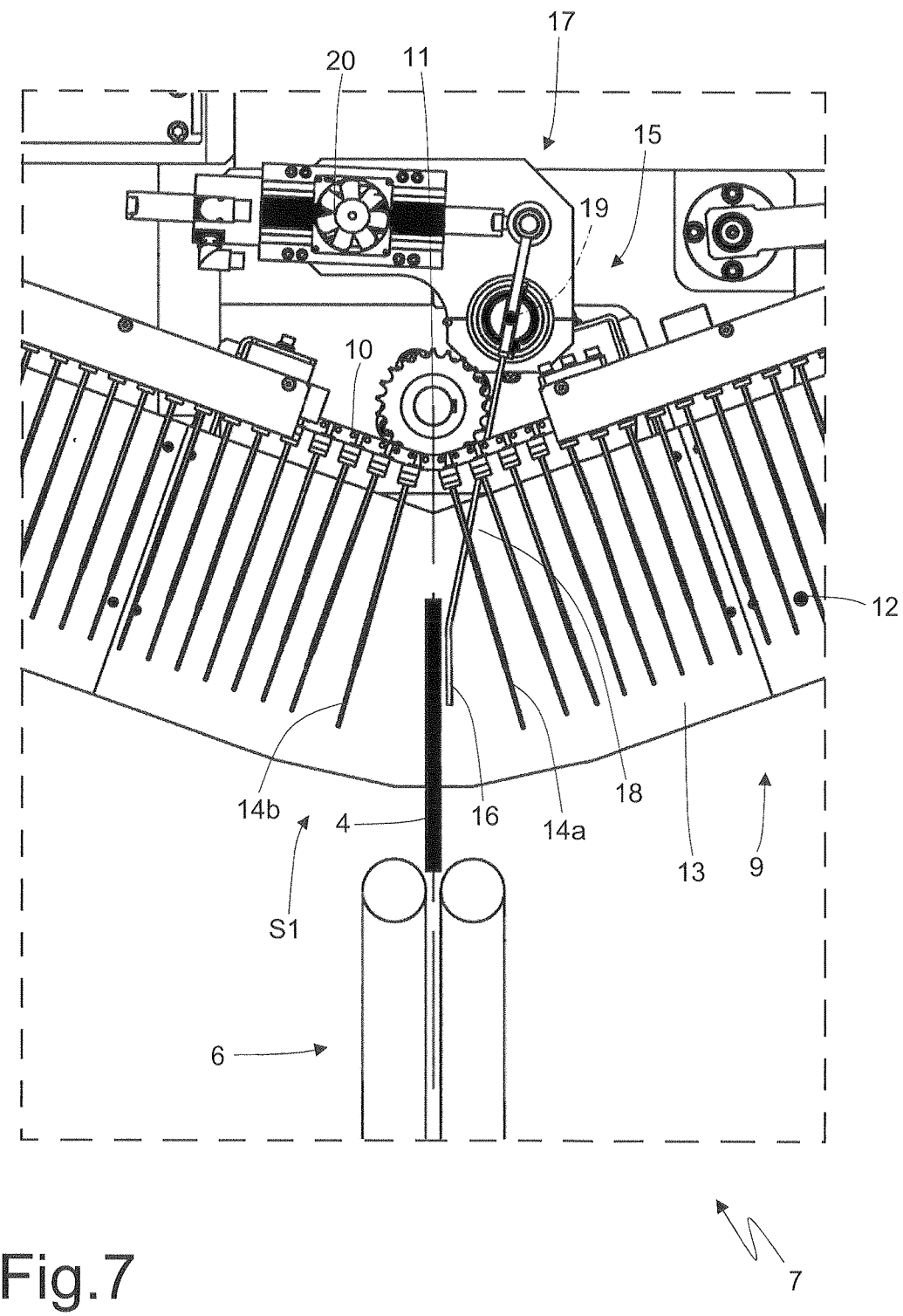
Figure 8:
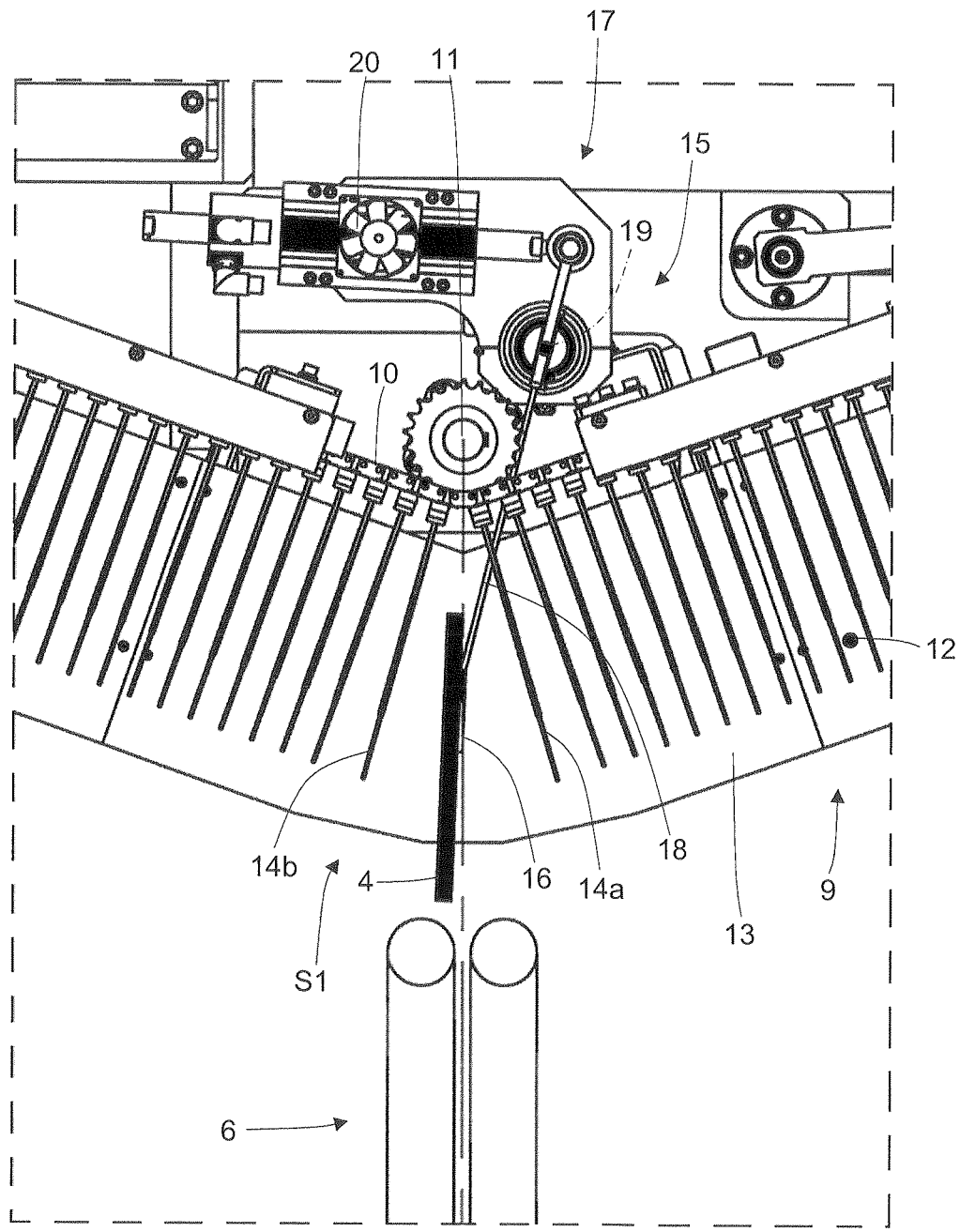
Figure 9:
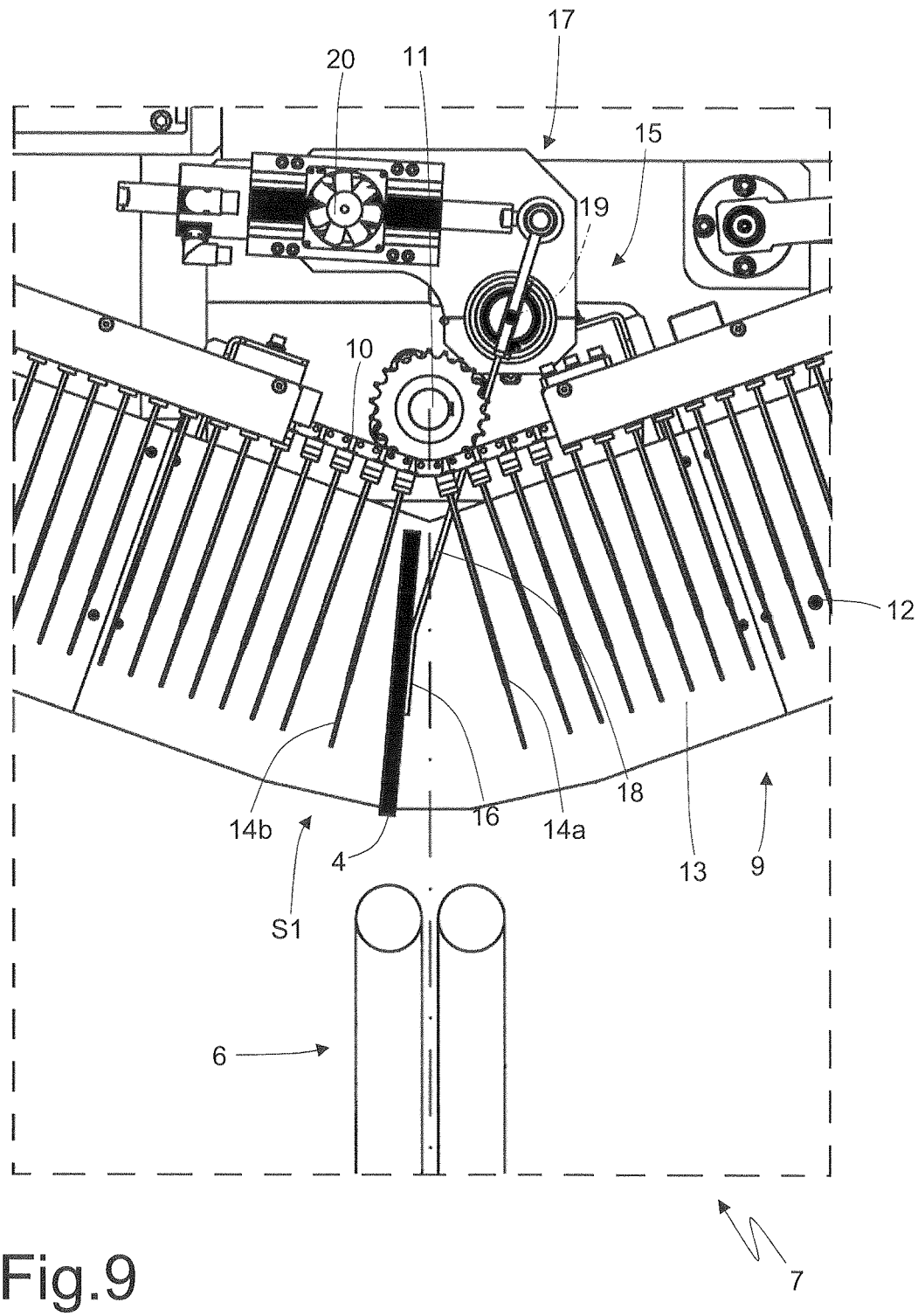

As illustrated in FIGS. 4, 5 and 6, the grouping unit 7 comprises an active braking device, which is arranged at the input station S1 so as to cooperate with a pocket 12 arranged in the input station S1 itself to slow down the movement with which a corresponding hygiene absorbent article 4 enters the pocket 12. The active braking device 15 is separate and independent from the conveyor 9 and therefore is not moved by the effect of the movement of the conveyor 9, but remains always in the input station S1 to cooperate from time to time with the pocket 12 that is arranged at that time in input station S1. The braking device 15 is active in the sense that the braking action (deceleration) acting upon a hygiene absorbent article 4 entering a corresponding pocket 12 in the input station S1 is not always present, but it is turned on and off according to the location of the hygiene absorbent article 4; in other words, the braking action (deceleration) which acts on a hygiene absorbent article 4 entering a corresponding pocket 12 in the input station S1 is absent (off) in the initial step of the hygiene absorbent article 4 entering the pocket 12 and is present (active) only in the final step of the hygiene absorbent article 4 entering the pocket 12.

The active braking device 15 comprises a pushing element 16, which is arranged inside each pocket 12 arranged in the input station S1 so as to push a corresponding hygiene absorbent article 4 which enters the pocket 12 against a blade 14 that delimits the pocket 12 itself. In other words, when a hygiene absorbent article 4 enters the corresponding pocket 12 arranged in the input station S1, the pushing element 16 progressively pushes the hygiene absorbent article 4 against one of the two blades 14 which delimit the pocket 12 to brake, by friction, the advancement of the hygiene absorbent article 4. The braking action of the pushing element 16 can only slow down the hygiene absorbent article 4 so that the hygiene absorbent article 4 comes into contact with the bottom of the pocket 12 (i.e. with the belts 10) at low speed (therefore determining an irrelevant mechanical rebound) or the braking action of the pushing element 16 can stop the hygiene absorbent article 4 when the hygiene absorbent article 4 has completely entered the pocket 12 so that hygiene absorbent article 4 does not come into contact with the bottom of the pocket 12 (i.e. with the belts 10) completely eliminating mechanical rebound.

Figure 10:
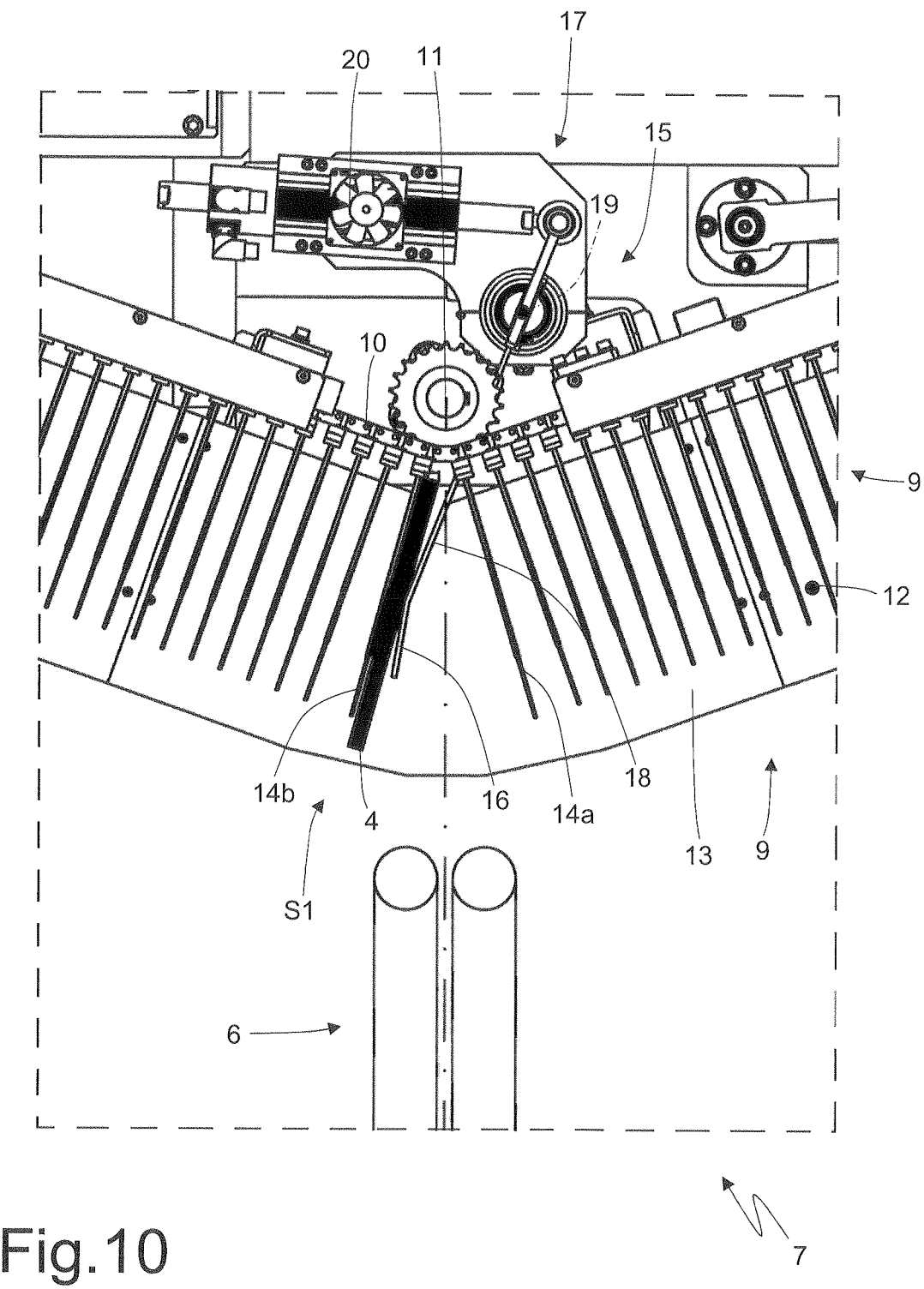

The active braking device 15 comprises a moving device 17, which cyclically moves the pushing element 16 between an open position (e.g. illustrated in FIG. 6) wherein the pushing element 16 is arranged close to a first blade 14a that delimits the pocket 12 arranged in the input station S1 so as to allow a corresponding hygiene absorbent article 4 to enter the space created between the pushing element 16 and a second blade 14b that delimits the pocket 12 and is opposite to the first blade 14a, and a closed position (illustrated in FIG. 10) wherein the pushing element 16 is close to the second blade 14b so as to push (press) the hygiene absorbent article 4 against the second blade 14b.

In the preferred, but not limiting, embodiment illustrated in the attached figures, the moving device 17 comprises an arm 18 that is rotatably mounted around a rotation axis 19 and supports the pushing element 16, and an actuator 20 that cyclically rotates the arm 18 around the rotation axis 19 to move the pushing element 16 between the open position and the closed position. In the preferred, but not limiting, embodiment illustrated in the attached figures, the actuator 20 is a linear actuator (i.e. alternately performs a back and forth linear movement) of electric or pneumatic type (for example comprising a linear electric motor).

The moving device 17 is synchronized with the movement of each hygiene absorbent article 4 entering a corresponding pocket 12 arranged in the input station S1 so that the pushing element 16 reaches the closed position when, and only when the hygiene absorbent article 4 has completely entered the pocket 12. Preferably, the moving device 17 is synchronized with a movement of each hygiene absorbent article 4 entering a corresponding pocket 12 arranged in the input station S1, so that the pushing element 16 reaches the closed position when, and only when the hygiene absorbent article 4 has completely entered the pocket 12 and has not yet come into contact with the belt 10.

As illustrated more clearly in FIG. 4, the conveyor 9 comprises two belts 10 which overlap one another, are vertically aligned, are arranged at a given distance from one another, and each comprising a succession of blades 14 so that each pocket 12 is delimited, on each side, by a pair of blades 14, which are vertically arranged one above the other and at a given distance from one another; the pushing element 16 is arranged in the space created between the blades 14 carried by an upper belt 10 and the blades 14 carried by a lower belt 10. In this way, the pushing element 16 can move freely inside the pocket 12 arranged in the input station S1 in a totally independent manner from the movement of the conveyor 9.

In FIGS. 6-10 the operation of the active braking device 15 is illustrated, in sequence: it can be seen how the pushing element 16 moves progressively from the open position (illustrated in FIG. 6) wherein the pushing element 16 is arranged close to the first blade 14a that delimits the pocket arranged in the input station S1 so as to allow the introduction of a corresponding hygiene absorbent article 4 in the space created between the pushing element 16 and a second blade 14b that delimits the pocket 12 and is opposite to the first blade 14a, to the closed position (illustrated in FIG. 10) wherein the pushing element 16 is close to the second blade 14b so as to push (press) the hygiene absorbent article 4 against the second blade 14b and therefore slow down (stop) the advancing of the hygiene absorbent article 4 along the pocket 12.

According to a different and not illustrated embodiment, which is not part of the present invention, the active braking device 15 is not of mechanical type as described above (i.e. the pushing element 16 is absent) and is instead of pneumatic type; in this embodiment, the active braking device 15 comprises at least one nozzle which is arranged, in a fixed position, at the input station S1 and is adapted to generate a blow of compressed air that is positioned inside the pocket 12 arranged in the input station S1 and hits the hygiene absorbent article 4 entering the pocket 12 itself. In particular, the blow of compressed air generated by the nozzle of the active braking device 15 is oriented in parallel and opposite direction with respect to the advancement direction of the hygiene absorbent article 4 entering the pocket 12 arranged in the input station S1.

The grouping unit 7 described above has numerous advantages.

First, the grouping unit 7 described above allows to attenuate (making it irrelevant) or to totally eliminate mechanical rebound of the hygiene absorbent articles 4 that enter pockets 12, against the bottom 12 of the pockets themselves. In this way, it is always guaranteed that, in the input station S1, the hygiene absorbent articles 4 are arranged in the correct position inside the corresponding pockets 12 and therefore the possibility that a hygiene absorbent article 4 assumes an undesired position inside the corresponding pocket 12 thus causing the clogging of the grouping unit 7 is totally eliminated. In other words, by eliminating the negative effects of the mechanical rebound of hygiene absorbent articles 4, entering the pockets 12, against the bottom of the pockets 12 themselves, it is ensured that in the input station S1 the hygiene absorbent articles 4 always have the correct position in the corresponding pockets 12 and thus a bad positioning of a hygiene absorbent article 4 which can cause clogging of the grouping unit 7 is prevented.

It is important to note that thanks to the fact that the braking action acting on a hygiene absorbent article 4 entering a corresponding pocket 12 in the input station S1 is present only in the final step of the hygiene absorbent article 4 entering a corresponding pocket 12, the introduction of the hygiene absorbent article 4 into a corresponding pocket is, anyway, very fast. In other words, the hygiene absorbent article 4 can quickly enter the corresponding pocket 12 and is decelerated (braked) only in the final step of the hygiene absorbent article 4 entering the pocket 12.

In addition, the grouping unit 7 described above is simple and inexpensive to produce, since the braking device 15 can be both easily integrated at the input station S1 without any particular modification to the existing structure, and is low-cost (it is essentially constituted by a linear motor, a hinge and an arm).

The invention claimed is:

1. A grouping unit (7) to form groups (3) of hygiene absorbent articles (4) in a packaging machine (1), the grouping unit (7) comprises:
   a conveyor (9), which receives, in succession, single hygiene absorbent articles (4) in an input station (S1), feeds the hygiene absorbent articles (4) along a grouping path (P), and releases groups (3) of hygiene absorbent articles (4) in an output station (S2);
   wherein the conveyor (9) comprises a closed belt (10) which is wound around at least two pulleys (11), and supports a plurality of blades (14), which extend perpendicular to the belt (10) and delimit, between one another, respective pockets (12), which are each designed to hold one and only one corresponding hygiene absorbent article (4);
   wherein a braking device (15) is provided, which is arranged at the input station (S1) so as to cooperate with a pocket (12) arranged in the input station (S1) in order to slow down a movement with which the corresponding hygiene absorbent article (4) enters the pocket (12);
   wherein the braking device (15) comprises a pushing element (16), which is arranged on an inside of each pocket (12) arranged in the input station (S1) to push the corresponding hygiene absorbent article (4) entering the pocket (12) against a blade (14) that delimits the pocket (12);

wherein the braking device (15) comprises a moving device (17), which cyclically moves the pushing element (16) between an open position and a closed position while within the pocket (12) arranged in the input station (S1) and delimited by a first blade (14a) and a second blade (14b);

wherein when in the open position, the pushing element (16) is closer to the first blade (14a) than the second blade (14b) so as to allow the corresponding hygiene absorbent article (4) to enter a space created between the pushing element (16) and the second blade (14b) and when in the closed position, the pushing element (16) is closer to the second blade (14b) than the first blade (14a) to push the corresponding hygiene absorbent article (4) against the second blade (14b); and wherein the pushing element (16) is configured to be moved into each pocket (12) arranged in the input station (S1) and subsequently moved out of each pocket (12) when the pocket (12) is conveyed away from the input station (S1).

2. The grouping unit (7) according to claim 1, wherein a braking action acting upon a hygiene absorbent article (4) entering a corresponding pocket (12) in the input station (S1) is absent in an initial step of an introduction of the hygiene absorbent article (4) into the corresponding pocket (12) and is present only in a final step of the introduction of the hygiene absorbent article (4) into the pocket (12).

3. The grouping unit (7) according to claim 1, wherein the moving device (17) comprises:
an arm (18), which is mounted so as to rotate around a rotation axis (19) and supports the pushing element (16); and
an actuator (20), which cyclically causes the arm (18) to rotate around the rotation axis (19) in order to move the pushing element (16) between the open position and the closed position.

4. The grouping unit (7) according to claim 1, wherein the moving device (17) is synchronized with a movement with which each hygiene absorbent article (4) enters a corresponding pocket (12) arranged in the input station (S1), so that the pushing element (16) reaches the closed position only when the hygiene absorbent article (4) has completely entered the corresponding pocket (12).

5. The grouping unit (7) according to claim 1, wherein the moving device (17) is synchronized with an introduction movement carried out by each hygiene absorbent article (4) to enter a corresponding pocket (12) arranged in the input station (S1), so that the pushing element (16) reaches the closed position when and only when the hygiene absorbent article (4) has completely entered the corresponding pocket (12) and has not yet come into contact with the belt (10).

6. The grouping unit (7) according to claim 1, wherein:
the conveyor (9) comprises two belts (10), which overlap one another, are vertically aligned, arranged at a given distance from one another and each comprising a succession of blades (14), so that each pocket (12) is delimited, on each side, by a pair of blades (14), which are vertically arranged one above the other and at a distance from one another; and
the pushing element (16) is arranged in an empty space created between the blades (14) supported by an upper belt (10) and the blades (14) supported by a lower belt (10).

7. A packaging machine (1) for hygiene absorbent articles (4) comprising:
a feeding unit (6) which receives the hygiene absorbent articles (4), in succession, from a manufacturing machine arranged upstream from the packaging machine (1);
a grouping unit (7) according to claim 1, which receives, in succession, single hygiene absorbent articles (4) from the feeding unit (6) in an input station (S1) and forms groups (3) of hygiene absorbent articles (4) that leave the grouping unit (7) in an output station (S2); and
a wrapping unit (8), which receives the groups (3) of hygiene absorbent articles (4) from the grouping unit (7) and introduces the groups (3) of hygiene absorbent articles (4) into respective wraps (5) to form packs (2).

8. A grouping method to form groups (3) of hygiene absorbent articles (4) in a packaging machine (1), the grouping method comprises the steps of:
feeding, along a grouping path (P), a conveyor (9) comprising a closed belt (10) which is wound around at least two pulleys (11) and supports a plurality of blades (14) which extend perpendicular to the belt (10) and delimit, between one another, respective pockets (12), which are each designed to hold one and only one corresponding hygiene absorbent article (4);
feeding, in succession, single hygiene absorbent articles (4) to corresponding pockets (12) of the conveyor (9) in an input station (S1);
removing groups (3) of hygiene absorbent articles (4) from the corresponding pockets (12) of the conveyor (9) in an output station (S2); and
slowing down the movement with which each single hygiene absorbent article (4) enters the corresponding pocket (12) arranged in the input station (S1) by means of an active braking device (15), which is arranged in an area of the input station (S1);
wherein the braking device (15) comprises a pushing element (16), which is arranged inside of the corresponding pocket (12) arranged in the input station (S1) so as to push each single hygiene absorbent article (4) entering the corresponding pocket (12) against a blade (14) that delimits the pocket (12);
wherein the braking device (15) comprises a moving device (17), which cyclically moves the pushing element (16) between an open position and a closed position while within the corresponding pocket (12) arranged in the input station (S1) and delimited by a first blade (14a) and a second blade (14b);
wherein when in the open position, the pushing element (16) is closer to the first blade (14a) than the second blade (14b) to allow each single hygiene absorbent article (4) to enter a space created between the pushing element (16) and the second blade (14b), and when in the closed position, the pushing element (16) is closer to the second blade (14b) than the first blade (14a) to push each single hygiene absorbent article (4) against the second blade (14b); and
wherein the pushing element (16) is configured to be moved into each corresponding pocket (12) arranged in the input station (S1) and subsequently moved out of each corresponding pocket (12) when the corresponding pocket (12) is conveyed away from the input station (S1).

* * * * *